United States Patent [19]

Winter et al.

[11] Patent Number: 4,600,060
[45] Date of Patent: Jul. 15, 1986

[54] DEPTH SENSING STRUCTURE FOR AN AGRICULTURAL IMPLEMENT

[75] Inventors: David C. Winter, Des Moines; John D. Long, Ankeny, both of Iowa

[73] Assignee: Deere & Company, Moline, Ill.

[21] Appl. No.: 546,621

[22] Filed: Oct. 28, 1983

[51] Int. Cl.⁴ ............................................ A01B 63/114
[52] U.S. Cl. ...................................................... 172/4
[58] Field of Search ............................. 172/2, 4, 239; 280/405 R, 405 B

[56] References Cited

U.S. PATENT DOCUMENTS

| | | | |
|---|---|---|---|
| 2,622,499 | 12/1952 | Fraga | 172/4 |
| 2,627,797 | 2/1953 | Acton | 172/4 |
| 2,755,721 | 7/1956 | Rusconi | 172/4 |
| 3,658,133 | 4/1972 | Sweet et al. | 172/4 |
| 4,176,721 | 12/1979 | Poggemiller et al. | 172/4 |

FOREIGN PATENT DOCUMENTS

| | | | |
|---|---|---|---|
| 86165 | 9/1958 | Denmark | 172/4 |
| 73184 | 5/1970 | German Democratic Rep. | 172/4 |
| 116384 | 1/1959 | U.S.S.R. | 172/4 |
| 125953 | 5/1959 | U.S.S.R. | 172/4 |

*Primary Examiner*—Richard T. Stouffer

[57] ABSTRACT

A soil-smoothing or leveling tool, such as a harrow or press wheel gang, is rockably connected to the rear of the main frame of a tillage or seeding implement. The tool frame width is substantial compared to the width of the implement, and the height of the tool frame relative to the main frame is sensed to provide an accurate indication of the average depth of penetration across the width of the implement. The angle-sensing device operably connected to the drawbar of the trailing tool senses the angle between the main frame and the drawbar, and a control valve assembly responsive to the sensed angle controls the main frame lift system to maintain a preselected relationship between the tool and the main frame and thereby accurately control tillage or planting depth.

24 Claims, 7 Drawing Figures

DEPTH SENSING STRUCTURE FOR AN AGRICULTURAL IMPLEMENT

BACKGROUND OF THE INVENTION

This invention relates generally to agricultural implements, and more specifically to structure for accurately determining and controlling the planting or tilling depth of such implements.

The depth of penetration of the tools on planting and tillage implements must be carefully controlled to achieve optimum productivity. Numerous factors such as changing soil conditions, implement weight, leakage in the depth-control cylinders and tire flex can cause changes in the operating depth of an implement. As soil moisture and soil consistency change, tool penetration can vary over a substantial range for a given wheel control cylinder setting. In addition, when fertilizer and/or seed are being metered from a hopper carried on the implement frame, soil penetration will change with the change in the weight of the materials carried by the hopper. If a depth-control cylinder leaks, the operator may be required to constantly adjust the cylinder to compensate for the loss and maintain a constant depth of penetration. On multiple-section implements which are hinged for flexing about generally fore-and-aft pivotal axes, the depth of penetration is commonly controlled by series-connected cylinders or by interconnected rockshafts. Depth can vary from section to section because of cylinder leakage in a series-cylinder system or because of torsional wind-up of the rockshaft of the rockshaft-connected system. On some implements, a hopper is carried only on one of the sections, usually the center section, and as the weight of the material in the hopper changes, the relative depths of penetration of the different sections will also change.

To overcome these and other problems associated with the many changing conditions which can affect implement frame height and the depth of penetration of the tools carried by the implement frame, numerous depth-sensing and depth-control devices have been devised. Some of these devices utilize a single depth-gauging wheel connected at one location along the width of the implement frame. In rough terrain, there is considerable variation between the wheel position of this type of sensor and the actual machine depth, particularly if the sensor wheel is positioned in a furrow or on a ridge. Surface irregularities can adversely affect the accuracy of these devices. Usually such devices are positioned so that the depth-gauging wheel rides on the untilled soil in front of the machine, and therefore the device cannot provide an accurate indication of the depth of the tilled soil. Devices such as shown in U.S. Pat. No. 4,355,688 utilize a wheel which rides over the tilled soil and provide some improvement in depth sensing. To provide a better average of implement frame height, more than one depth-control wheel can be utilized to provide depth indications, and the indications can be averaged. The multiple devices are relatively expensive and bulky, and in certain situations still do not provide a good indication of the average frame height.

Other depth-sensing devices include ultrasonic sensors mounted on the implement frame for ultrasonically detecting the height of the frame above the ground. Several of these devices can be used per frame section and can be connected to electronic circuitry for providing an average height of the implement frame. However, these devices are quite sensitive and can be adversely affected by trash flow or local soil irregularities. Electronically averaged systems require wiring harnesses connected between the sensors and the control box on the cab of the towing vehicle. To provide an accurate average over the entire width of each implement section, numerous sensors must be utilized which increases the cost and complexity of the system significantly.

It is therefore an object of the present invention to provide an improved depth-sensing arrangement for an agricultural implement.

It is a further object to provide a depth-sensing arrangement for an agricultural implement which is less costly, more accurate and less sensitive to local irregularities than at least most previously available systems. It is another object to provide such a system which accurately averages the depth of the implement over substantially its entire width.

It is a further object to provide a depth-sensing system for an agricultural implement which more accurately gauges the depth of tilled soil without the need to mount additional gauging wheels. It is a further object to provide such a system which utilizes a soil-smoothing attachment which is common to many seeding and tillage implements to thereby minimize the amount of additional hardware which must be attached to the principal tillage or seeding implement frame.

It is still another object of the present invention to provide a height-sensing device which requires only a single sensor to provide an indication of the overall average of the distance of a tillage implement above the ground. It is a further object to provide such a sensor which can be utilized on each section of a multiple-section implement to independently regulate the depth of penetration of the tools on each implement section.

It is another object of the present invention to provide a depth-sensing arrangement for an agricultural implement which effectively utilizes a soil-leveling or smoothing implement such as a spring-tine harrow or rolling-basket harrow to provide an average depth indication over a substantial portion of the width of the implement. It is another object to provide such an arrangement which averages over a large area of tilled soil.

In accordance with the above objects, a smoothing implement such as a spring-tine harrow, a rolling-basket harrow or a press wheel gang is pivotally connected to the rear portion of the tool-carrying frame of a planting or tillage implement. The depth of penetration of the tools is dependent upon the height of the implement frame above the ground, and as this height changes, the smoothing tool will rock about its pivotal connection with the main frame. The angle between the main frame and the trailing implement provides an indication of the depth of penetration of the tools. A hydraulic or electrohydraulic actuator utilizes the indication of the angle between the trailing tool and the main frame to control the wheel lift cylinders to maintain the implement frame and thus the tillage tools at a preselected operating depth. In one embodiment, where three or more fore-and-aft extending arms are pivotally connected to the main frame to tow the trailing implement, the sensor is positioned on the central-most arm to provide an averaging effect. In another embodiment, where only two arms are necessary to tow a narrower trailing implement, a transverse member is connected to the arms and the sensor is operably connected to a central portion of the transverse member to provide the averaging effect across the two arms. When a multi-section implement is utilized, a separate sensor is provided for each section to individually control the respective hydraulic cylinder or cylinders to adjust the depth of that section.

The cost and complexity of the depth-sensing system is reduced by using the existing components on a tillage or planting system. An accurate indication of depth is provided by averaging the depth of tilled soil over a substantial portion of the width of the implement. Local irregularities are absorbed by the individual elements of the smoothing attachment. By utilizing a trailing smoothing implement to sense depth, depth can be controlled relative to the final soil surface, which is particularly useful with planting and seeding equipment. The rear mounted system also prevents the controlled implement from dropping too deeply when crossing a swale.

These and other objects, features and advantages of the present invention will become apparent to those skilled in the art from the description which follows and from the drawings.

DESCRIPTION OF THE PREFERRED EMBODIMENT

Figure 1:
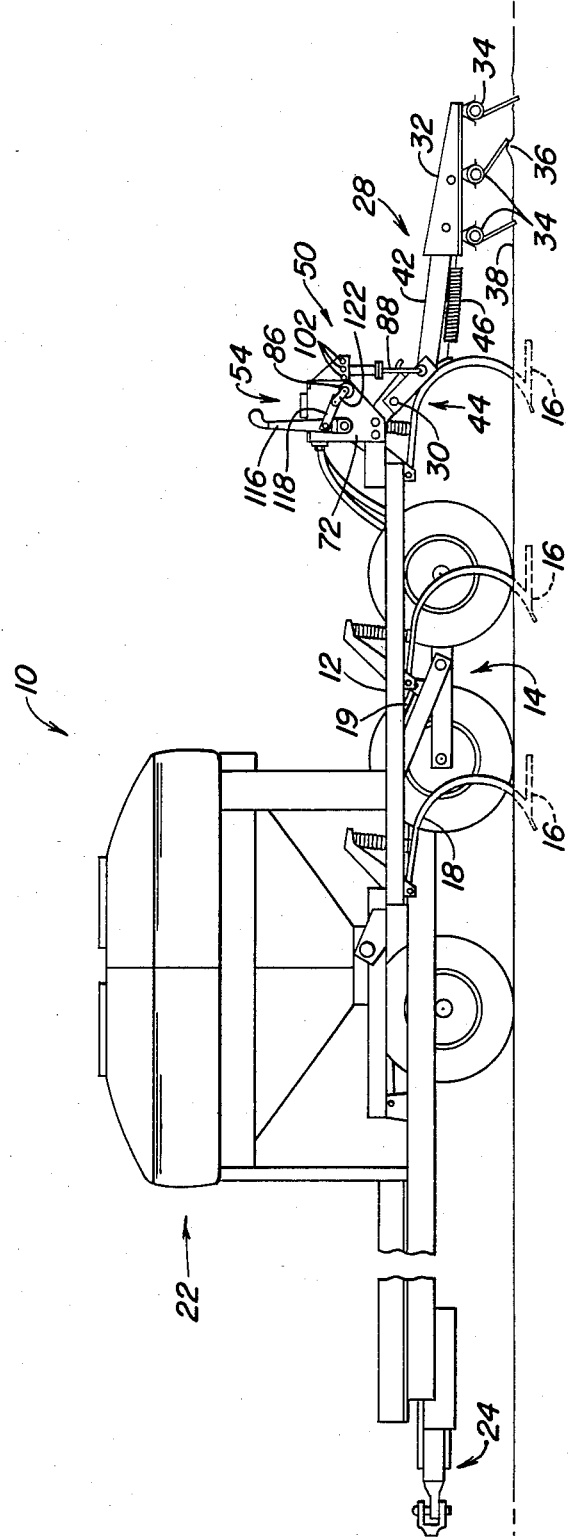
FIG. 1 is a side view of an implement with the depth-sensing apparatus of the present invention attached thereto.

Referring now to FIG. 1, therein is shown an agricultural implement 10 having a main frame 12 supported for forward movement over the ground by a plurality of vertically adjustable and transversely spaced ground wheel assemblies 14. A plurality of ground-penetrating tools 16 are carried by shank assemblies 18 which in turn are fixed to the main frame 12. The ground wheel assemblies 14 can be extended or retracted by hydraulic cylinders 19 to raise and lower the frame 12 to move the tools 16 between lower ground-engaging positions and upper transport positions and to adjust the depth of penetration of the tools when in the ground-working position.

Supported on the main frame 12 is a grain and fertilizer hopper structure 22. A conventional air distribution system (not shown) conveys grain and/or fertilizer from the bottom of the hopper 22 to locations directly behind the ground-penetrating tools 16. The implement 10, which is shown as the commercially available as the John Deere Model 655 Central Metering Seeder, includes a front hitch member 24 adapted for connection to a towing vehicle for forward movement over the ground. The seeder is shown by way of example only of one of the many implements which may be utilized with the present invention.

A trailing attachment 28 such as a leveling or smoothing implement is connected to the rear of the main frame 12 for pivoting about a transverse axis 30 and extends substantially the entire width of the main frame 12. In the preferred embodiment, the attachment 28 is a harrow and includes frame structure 32 supporting several fore-and-aft spaced rows of spring tines 34. Such an attachment is described in U.S. Pat. No. 4,304,306. The individual tines 34 are spring-mounted and each may move over clods or obstructions, such as shown in 36, individually of the other tines so that the frame structure 32 generally stays a constant average distance above the ground surface 38 regardless of local irregularities. The frame structure 32 is connected by a plurality of transversely spaced and fore-and-aft extending connecting arms or drawbars 42 connected at one end to the frame structure and at the opposite end to hinge bracket structure 44 which permits the arms 42 and therefore the frame structure 32 with tines 34 to pivot about the transverse axes 30. The harrow device 28 is pivoted from the implement frame 12 and floats on the spring tines 34 which drag over the surface of the ground behind the implement to level the ground and break up clods. A down-pressure spring 46 is connected between the frame structure 32 and the main frame 12. As the depth of the implement 10 changes, the harrow device 28 will rotate about the transverse axis 30; however, the effects of local irregularities such as shown at 36 will be absorbed by individual spring tines 34 which are free to deflect independently of the other tines on the harrow 28. As a result the frame structure 32 will remain a substantially constant distance above the tilled soil. Therefore, as the height of the main frame 18 changes with varying soil and tire conditions, grain tank load, or cylinder leakage or the like, the height of the harrow attachment 28 with respect to the frame 18 will vary to change the angle of the arms 42 with respect to the frame 18. Since the attachment 28 rides over the surface of the tilled soil 38, the angle provides an accurate indication of the depth of the tilled soil.

In the preferred embodiment, an angle-sensing or angle-responsive device 50 is operably coupled to a wheel lift control valve assembly 54. The assembly 54 is connected between a source of hydraulic fluid 56 on the tractor and the lift cylinder 19. The angle-sensing device 50 and the control valve assembly 54, which may be of the type shown in U.S. Pat. No. 4,355,688, are so constructed that when the implement 10 is in the field-working position and the angle sensed between the harrow 28 and the main frame 12 is within a preselected range of values corresponding to the proper depth of penetration of the tools 16, the valve assembly 54 will be in a neutral or balance position so that movement of the cylinder 19 is prevented. If the harrow attachment 28 pivots downwardly about the axis 30 indicating that the depth of tilled soil is decreasing, the valve assembly 54 will be activated to cause the cylinder 19 to retract and lower the frame 12 and thus increase the depth of penetration of the tools 16. As the tools move to the proper depth of penetration, the valve is moved back to its neutral position. If the depth of the tilled soil becomes greater than a preselected maximum depth, the valve assembly 54 is shifted to a raise position, and the cylinder 19 is extended to raise the frame 12 until the harrow 22 rotates about the axis 30 to a position indicating proper tool depth at which time the valve assembly will be shifted to the neutral position.

Figure 3:
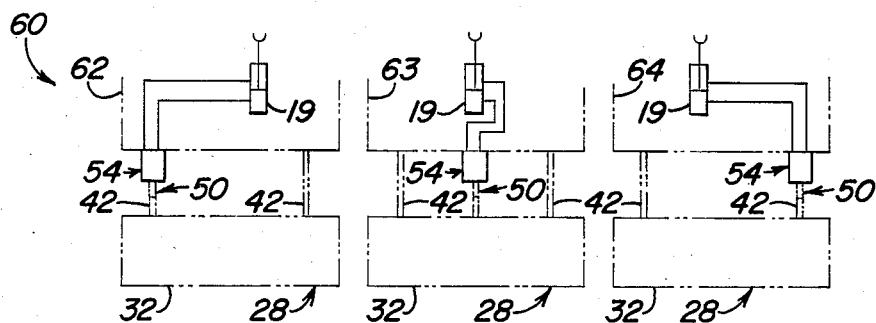
FIG. 3 is a schematical representation of a multi-section implement with a depth-sensing device connected to each section.

In a multi-section implement, such as illustrated at 60 in FIG. 3, each section 62, 63, 64 is individually controlled by a separate depth-control system including hydraulic cylinder 19, angle-sensing device 50 and control valve assembly 54. In the preferred embodiment, variations in the control depth of the implement caused by differences in height of one end of the harrow frame structure 32 relative to the opposite end are minimized by sensing the angle between the main frame 12 and harrow 28 from a centrally located arm 42 such as shown on the center section 63 of FIG. 3. On the outer most sections 62 and 64, which typically are narrower than the center frame 63, only two arms 42 may be necessary, and more accurate depth control is achieved utilizing the outermost arm 42 because the inboard portion of the outrigger tends to follow the main frame, and the outermost arm is more closely aligned with the controlled ground wheel on the outrigger. Alternatively, an averaging device such as shown at 65 in FIG. 4 can be provided. In the preferred embodiment, the averaging device 65 includes a transverse beam 66 connected to the pair of arms 42 an equal distance behind the respective pivots 30. The angle-sensing device 50 is operably connected to the center portion of the beam 66 so that the angle sensed by the member 50 will be an average of the two angles represented by the pair of arms 42.

Figure 4:
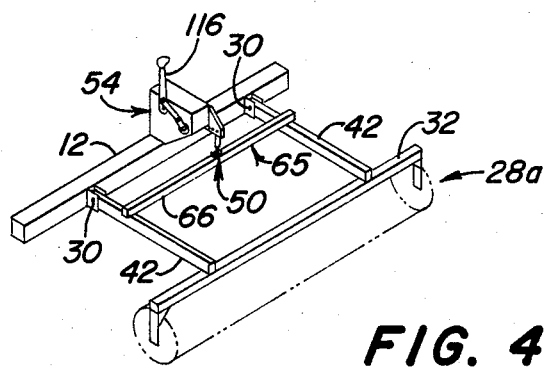
FIG. 4 is a perspective view of a rear portion of an implement with a rolling-basket harrow or press wheel gang pivotally connected thereto and including additional apparatus for providing a more accurate average depth indication.
Figure 5:
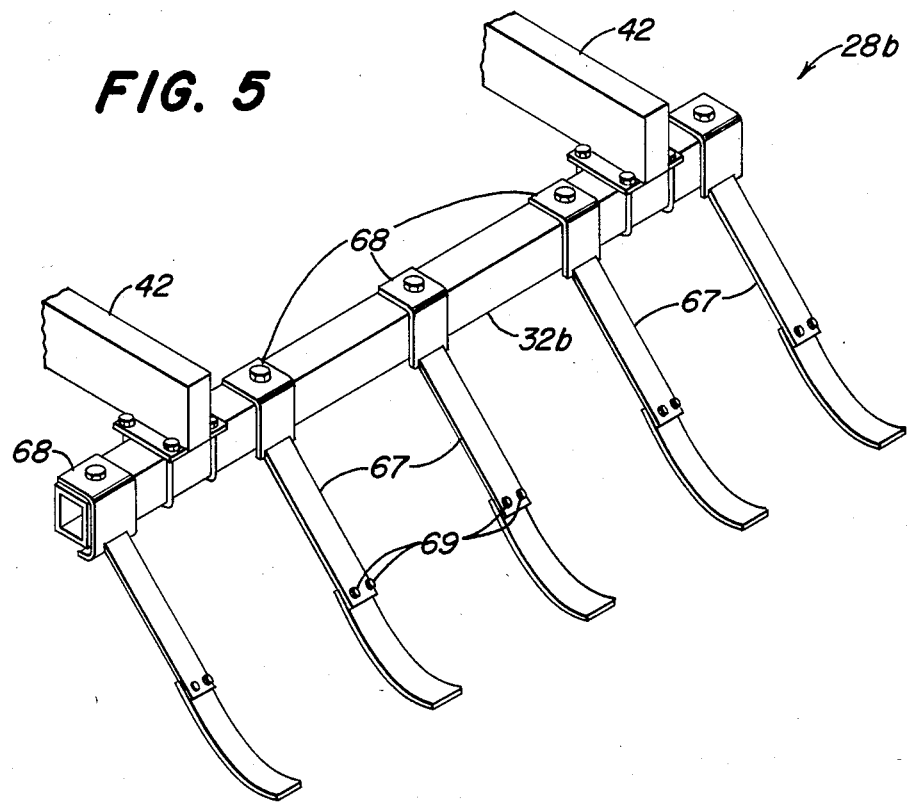
FIG. 5 is a perspective view of an alternate type of trailing implement which may be utilized with the present invention.

Preferably the attachment 28 is a spring-tine harrow, but other soil-smoothing or leveling tools may likewise be used. For example, as shown in FIG. 4, the tool 28a is a rolling type of smoothing tool such as a rolling-basket harrow. When the present invention is utilized with a planting implement such as an air seeder, the rolling smoothing tool 28a may be press wheels mounted in a gang on the frame 32. When a press wheel assembly is utilized as the ground-level sensing portion of the system, preferably the individual press wheels are spring loaded downwardly so that each wheel may follow surface irregularities independently of the other wheels to provide an accurate average depth across the width of the press wheel assembly. In FIG. 5, the attachment 28b is shown as a plurality of resilient skids 67 extending downwardly and rearwardly from frame structure 32b which includes a single transverse beam supported on the aft ends of the arms 42. The skids 67 are formed from strips of heat-treated 1080 metal stock and are connected to the frame 32b by conventional brackets 68. Each skid 67 can flex independently over rocks and clods or the like so that the frame 32b remains a substantially constant average distance above the surface of the tilled soil. The lower portion of the skids 67 are connected to the upper portions by bolts 69 so that the lower portions can be replaced after being worn by the soil. The attachment 28b can be used when a soil-smoothing tool is not needed.

Figure 2:
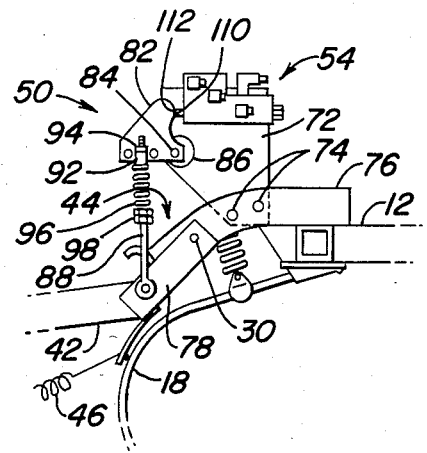
FIG. 2 is a side view of a portion of the device shown in FIG. 1 including the angle-sensing device.

Referring now to FIGS. 1 and 2 for a more detailed description of the angle-sensing or angle-responsive device 50, a baseplate 72 is fixed by bolts 74 to an angled member 76 of the hinge bracket 44. The member 76 is in turn fixed to the main frame 12. A pair of side plates 78 are welded to opposite sides of and form the forward portion of the fore-and-aft extending arm 42 and the complementary portion to member 76 of the hinge bracket structure 44. The pivot 30 extends through the side plates 78 and the angled member 76. A rotating member 82 is fixed for rotation about a pivot 84. The pivot 84 is located off-center in a circular adjusting member 86 supported in the baseplate 72. An eyebolt 88 has its eye end pivotally connected to one side plate 78 rearwardly of the pivotal axis 30. The eyebolt 88 extends upwardly and supports a trunnion 92 which is connected to the rotating member 82 rearwardly and radially outwardly of the pivot 84. The trunnion 92 which is slidably received over the shank of the eyebolt 88 is urged upwardly against a keeper nut 94, threaded on the end of the bolt 88, by a spring 96 having a lower end abutting against adjusting nuts 98. As the arm 42 pivots up and down with changing tilled soil depth, the member 82 will be caused to rotate therewith about its pivotal axis 84. The amount of rotation of the member 82 relative to the member 42 may be changed by adjusting the trunnion 92 radially with respect to the pivot 84. A plurality of apertures 102 are provided in the rotating member 82 at varying radial distances from the pivot 84, and the trunnion is placed through one of the apertures dependent on the desired sensitivity of the unit.

Figure 6:
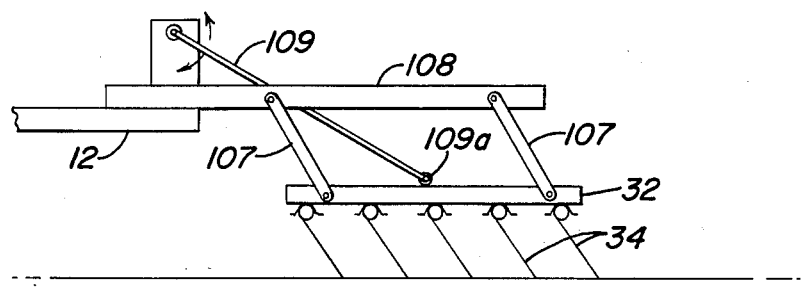
FIG. 6 is a side view of an angle-sensing arrangement utilized with a trailing implement supported from the main frame by parallel links.

In a trailing implement of the type shown in FIG. 6 which is supported by parallel links 107 from arms 108 fixed to the main frame 12, the angle-sensing device may be operably connected to one of the parallel links 107. However, more accurate control may be had by pivotally mounting the fore end of a separate sensing arm 109 to the main frame 12 and letting the aft end of the arm ride on top of the trailing implement frame 32. The angle-sensing device 50 (not shown in FIG. 9) is connected to the sensing arm 109 and is responsive to changes in angle between the arm and the frame 12. A roller 109a connected to the aft end of the arm 109 for rotation about a transverse axis permits the arm 109 to move relative to the frame 32 in the fore-and-aft direction while constraining the arm 109 to rotate about its pivotal connection with the main frame with changes in height of the frame 32 with respect to the frame 12.

The control valve assembly 54 is supported on the baseplate 72 adjacent to the rotating member 82. The valve assembly 54 includes a plunger 110 biased outwardly against a contact portion 112 of the rotating member 82. The axial location of the plunger 110 is therefore determined by the position of the rotating member 82, which in turn is determined by the angle of the connecting arm 42 with respect to the frame 12. The location of the plunger 110 for a given angular relationship between the arm 42 and the frame 12 can be adjusted by rotating the circular adjusting member 86 which relocates the pivot 84. A movable handle 116 is pivotally connected to the plate 72 and is rotationally connected to the circular adjusting member 86 by a link 118 connected between the handle 116 and a crank 122 fixed to the member 86. Alternatively, a remote actuator controlled from the tractor cab may be provided to rotate the member 86 and adjust the depth of penetration of the tools to the desired range.

An electrohydraulic valve 120 (FIG. 7) is connected between a voltage supply 122 and plunger-operated switches 124 and 126. When the arms 42 pivot upwardly to rock the member 82 in the clockwise direction, the plunger 110 is depressed and closes switch 124 to move the valve 120 to a raise position to extend the cylinder 19. The cylinder 19 extends until the plunger 110 again moves to the neutral position (FIG. 7) wherein both switches 124 and 126 are open. Movement of the plunger 110 to the left activates the switch 126 to move the valve 120 to a lower position which causes the cylinder to retract until the plunger 110 is again moved to the neutral position. If a more detailed description of the assembly 54 and the circuit associated therewith is desired, reference may be had to the aforementioned U.S. Pat. No. 4,355,688.

Figure 7:
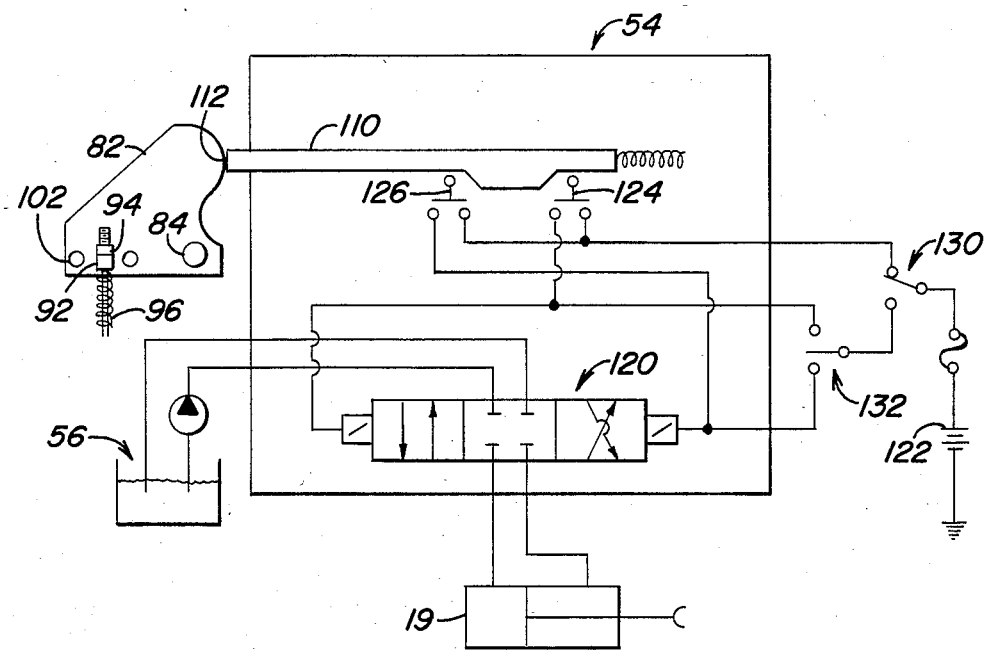
FIG. 7 is a schematic of a control valve assembly for use with the depth-sensing apparatus of FIG. 2.

In operation, the handle 116 (FIG. 1) is adjusted so that the plunger 110 and the valve 120 are in the neutral position shown in FIG. 7 at the desired depth of penetration of the tools 16. As long as the angle between the arm 42 and the main frame 12 does not deviate more than a small amount from the desired angle, indicating that the depth of tilled soil is within a preselected acceptable range, the valve 120 remains in the neutral position. In the neutral position, the base end of the cylinder 19 is blocked to lock the wheel assemblies 14 relative to the frame 12 against relative movement that would change the depth of penetration. If because of factors such as increasing implement weight, changing soil or tire conditions, or leaking cylinders, the depth of penetration of the tools 16 increases beyond the range selected by the handle 116, the trailing tool 28 will pivot upwardly with respect to the frame 12. The spring 96 pushes upwardly against the rotating member 82 which in turn depresses the plunger 110 to close the switch 124 and move the hydraulic valve 120 to the right to the raise position. In the raise position, flow is directed to the base end of the cylinder 19 from the source 56 to extend the cylinder and raise the frame 12 until the angle of the trailing tool 28 with respect to the main frame 12 is within the range determined by the setting of the handle 116, at which time the switch 124 will open to move the valve 120 to the neutral position. If the depth of penetration of the tools 16 decreases to a value below the preselected range, the member 82 will rotate away from the valve assembly 54 to thereby permit the plunger 110 to be biased to the left as viewed in FIG. 7 and close the switch 126 to move the valve 120 to the lower position. The cylinder 19 is retracted until the plunger 110 is returned to the neutral position by upward rotation of the trailing tool 28 with respect to the main frame 12. A first operator control switch 130 on the towing vehicle permits selection of either a manual or automatic control mode. In the manual mode, a second operator control switch 132 permits the operator to control the cylinder 19 independently of the position of the plunger 110.

The spring 96 will compress to prevent damage to the valve assembly 54 if the arm 42 should pivot upwardly after the plunger 110 is completely depressed, which may happen, for example, when the implement passes through a deep gulley or the like. The valve 120 is given by way of example only and it is to be understood that other valve arrangements could likewise be utilized with the device of the present invention to control the cylinder 19. For example, a multi-position hydraulic valve or a variable orifice valve may be mechanically connected to the plunger 110 to extend or retract the cylinder 19 in response to relative changes in height between the trailing implement 28 and the frame 12.

It is evident from the above that a much more accurate average depth is sensed with the present invention, and abrupt changes in angle caused by local irregularities in the ground surface are reduced. The present system advantageously utilizes a trailing soil-smoothing tool to provide an average depth indication across substantially the entire width of the implement. By sensing behind the implement, depth is controlled relative to the final soil surface rather than to the undisturbed soil surface which results in more accurate planting depth. Another advantage of the rear mounted depth-sensing arrangement is that when the implement is crossing a ditch or a swale, the depth-control system will prevent the implement from dropping in too deep whereas a forward mounted sensor will drop into the swale first and cause the implement to go deeper as it traverses the swale.

Having described the preferred embodiment, it will be apparent that modifications can be made without departing from the scope of the invention as defined in the accompanying claims.

We claim:

1. In an agricultural implement having a transversely extending main frame, ground-working tools supported by the frame, and activatable lift means for raising and lowering the frame with respect to the ground to adjust the depth of penetration of the tools, depth-control structure comprising:

a soil-smoothing tool pivotally connected to the rear of the main frame for rocking vertically with respect to the main frame the soil-smoothing tool including transversely extending frame structure the width of which is substantial compared to the width of the main frame and a fore-and-aft extending arm connected for rocking with the frame structure and extending forwardly therefrom to a front end, means hingedly connecting the front end to the rear of the main frame for rocking about a transverse axis;

means for sensing the height of the soil-smoothing tool relative to the main frame including means for sensing the angle between the main frame and the arm, wherein said means for sensing the angle includes a first member supported for rotation on the main frame, a rod member connected at one end to the arm rearwardly of the transverse axis and at the opposite end to the first member radially outwardly of the transverse axis for rotating the member about a rotational axis as the arm rocks about the transverse axis; and means responsive to the sensed relative height and operably connected to the lift means for actuating the latter to maintain a preselected relationship and therefore maintain the depth of penetration of the tools within a preselected range.

2. The invention as set forth in claim 1 wherein the smoothing tool comprises a plurality of teeth individually spring-loaded into contact with the soil tilled by the ground-working tools, said teeth connected to the frame structure and transversely spaced thereon substantially the entire width thereof so that the frame structure remains a substantially constant average distance above the surface of the ground directly behind the implement regardless of local surface irregularities.

3. The invention as set forth in claim 1 wherein the smoothing tool comprises a rolling-basket harrow.

4. The invention as set forth in claim 1 wherein the smoothing tool comprises a plurality of press wheels transversely spaced substantially the entire width of the main frame.

5. The invention as set forth in claim 1 including a pair of fore-and-aft extending arms pivotally connected at their forward ends to the rear of the main frame adjacent the outermost ends thereof, said arms connected at their rearward ends to the frame structure, means for providing an indication of the average angle between the main frame and the two forward ends of the arms, and wherein the means for sensing the height is responsive to the means for providing an average angle indication.

6. The invention as set forth in claim 5 wherein the means for providing an average angle indication includes a rigid transverse member extending between and movable with the pair of arms.

7. The invention as set forth in claim 1 wherein the lift means includes a hydraulic motor and the means responsive to the sensed relative height comprises a hydraulic valve connected between a source of pressurized hydraulic fluid and the hydraulic motor.

8. The invention as set forth in claim 1 further comprising means for adjusting the sensitivity of the angle-sensing means including means for adjusting the distance between the rotational axis and said one end of the rod member.

9. The invention as set forth in claim 1 wherein the rotational axis of the first member is adjustable relative to the frame.

10. The invention as set forth in claim 1 wherein the lift means includes a hydraulic motor and the means responsive to the sensed angle comprises a multi-position hydraulic valve connected to the hydraulic motor and wherein the rotational member is operably coupled to the valve to position the latter in accordance with the sensed angle.

11. In an agricultural implement having a transversely extending main frame, ground-working tools supported by the frame, and activatable lift means for raising and lowering the frame with respect to the ground to adjust the depth of penetration of the tools, depth-control structure comprising:

a trailing attachment including a transverse attachment frame, a plurality of soil-contacting elements transversely spaced on the attachment frame and individually biased downwardly therefrom into ground contact, said elements movable generally independently of each other over local irregularities in the ground surface, arm means rockably connecting the attachment frame to the main frame for permitting relative vertical movement between the frames; and means responsive to the relative vertical movement between frames for activating the lift means to maintain the depth of penetration of the ground-working tools within a preselected range of values, said means responsive including a sensing arm pivotally connected to the main frame and extending rearwardly therefrom toward the attachment frame, and means for moving the aft end of the sensing arm about the pivot as the main and attachment frames move vertically relative to each other, said means for moving the aft end comprising a rolling member movable fore-and-aft with respect to the attachment frame while constraining the sensing arm to rotate about the pivot as the height of the main and attachment frames change relative to each other.

12. The invention as set forth in claim 11 wherein the trailing attachment comprises a soil-smoothing implement having a transverse dimension approximately equal to the transverse dimension of the main frame.

13. The invention as set forth in claim 12 wherein the attachment comprises a rolling-basket harrow.

14. The invention as set forth in claim 12 wherein the attachment comprises a gang of press wheels.

15. The invention as set forth in claim 11 wherein the arm means comprises a fore-and-aft extending arm connected at its aft end to the attachment frame and at its forward end to the main frame, and the means responsive to relative vertical movement includes a multi-position control operably connected to the lift means, and angle-responsive means connected between the main frame and the forward end of the arm for positioning the control in response to changes in angle between the main frame and the arm.

16. The invention as set forth in claim 15 wherein the lift means includes a hydraulic cylinder and the control comprises a hydraulic valve.

17. The invention as set forth in claim 11 wherein the attachment includes transversely spaced skids.

18. The invention as set forth in claim 17 wherein the skids comprise a resilient strip of metal extending downwardly and rearwardly from the attachment frame.

19. The invention as set forth in claim 18 wherein the transverse attachment frame comprises a single transverse beam and the skids are transversely spaced on the beam and extend generally the entire width of the main frame.

20. In an agricultural implement having a transversely extending main frame, ground-working tools supported by the frame, and activatable lift means for raising and lowering the frame with respect to the ground to adjust the depth of penetration of the tools, depth-control structure comprising:

a ground-contacting member connected to the main frame for movement vertically with respect to the main frame as the depth of penetration changes; and means responsive to the vertical movement of the ground-contacting member and operably connected to the lift means for actuating the lift means to maintain the depth of penetration of the tools within a preselected range, said means responsive comprising a rotating member having an axis of rotation and a lift means operating portion offset from the axis of rotation, means for pivoting the rotating member about the axis as the ground-contacting member moves vertically including a connecting member extending between the ground-contacting member and the rotating member, means for adjusting the sensitivity of the means responsive to the vertical movement including means attaching the connecting member to the rotating member at varying radial distances from the rotational axis, and means for changing the location of the operating portion relative to the lift means.

21. The invention as set forth in claim 20 wherein the means for changing the location of the operating portion comprises an adjusting member supporting the rotational member, and means for moving the adjusting member to change the location of the rotational axis.

22. The invention as set forth in claim 21 wherein the adjusting member includes a circular member rotatably mounted on the frame for rotation about a second axis offset from the axis of rotation, and the means for moving comprises means for rotating the circular member.

23. In an agricultural implement having a transversely extending main frame, ground-working tools supported by the frame, and activatable lift means from raising and lowering the frame with respect to the ground to adjust the depth of penetration of the tools, depth-control structure comprising:

a soil-smoothing tool having a transversely extending frame the width of which is substantial compared to the width of the main frame;

means pivotally connecting the smoothing tool to the rear of the main frame for rocking vertically with respect to the main frame, said means connecting including a pair of fore-and-aft extending arms pivotally connected at their forward ends to the rear of the main frame adjacent the outermost ends thereof, said arms connected at their rearward ends to the soil-smoothing tool frame, and means for providing an indication of the average angle between the main frame and the two forward ends of the arms;

means responsive to the average angle indication for sensing the height of the soil-smoothing tool relative to the main frame; and means responsive to the sensed relative height and operably connected to the lift means for actuating the latter to maintain a preselected relationship and therefore maintain the depth of penetration of the ground-working tools within a preselected range.

24. The invention as set forth in claim 23 wherein the means for providing an average angle indication includes a rigid transverse member extending between and movable with the pair of arms.

* * * * *